(12) United States Patent
Zhang et al.

(10) Patent No.: US 8,516,704 B2
(45) Date of Patent: Aug. 27, 2013

(54) METHOD OF MANUFACTURING SUSPENSION SUPPORT DEVICES

(75) Inventors: Guo Ji Zhang, Shenzhen (CN); Kam Fung Cheng, Hong Kong (CN); Yue Li, Hong Kong (CN); Jian Hong Wu, Shenzhen (CN); Hong Liu, Shenzhen (CN); Guan Lei Jiang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 1076 days.

(21) Appl. No.: 12/502,375

(22) Filed: Jul. 14, 2009

(65) Prior Publication Data

US 2010/0005660 A1   Jan. 14, 2010

(30) Foreign Application Priority Data

Jul. 14, 2008  (CN) .......................... 2008 1 0068514

(51) Int. Cl.
*B23P 13/00*   (2006.01)
(52) U.S. Cl.
USPC ......... 29/896.91; 29/17.1; 29/17.2; 29/896.9; 359/811; 359/815; 359/819

(58) Field of Classification Search
USPC .................. 29/17.1, 17.2, 825, 829, 830, 831, 29/896.9, 896.91; 333/262, 101, 103, 104, 333/246; 359/811, 815, 819; 396/439
See application file for complete search history.

(56) References Cited

U.S. PATENT DOCUMENTS 6,188,301 B1 *   2/2001   Kornrumpf et al. .......... 333/262

* cited by examiner

*Primary Examiner* — Richard Chang
(74) *Attorney, Agent, or Firm* — Muncy, Geissler, Olds & Lowe, PLLC

(57) ABSTRACT

A method of manufacturing suspension devices comprising the steps of:
a) forming an integral elastic sheet, the elastic sheet having first and second suspension devices, each suspension device being provided with attachment parts configured to be fixed to a movable object, fixing parts configured to be fixed to a base, and elastic parts connected between the attachment parts and the fixing parts respectively and configured to bias the object relative to the base, the elastic parts of the suspension devices being alternately distributed;
b) separating the first and second suspension devices from each other before being attached to the object.

11 Claims, 6 Drawing Sheets

METHOD OF MANUFACTURING SUSPENSION SUPPORT DEVICES

CROSS REFERENCE TO RELATED APPLICATIONS

This non-provisional patent application claims priority under 35 U.S.C. §119(a) from Patent Application No. 200810068514.5, filed in The People's Republic of China on Jul. 14, 2008.

FIELD OF THE INVENTION

This invention relates to a method of manufacturing suspension devices such as the springs used to support a lens holder in a voice coil motor actuated lens module of a miniature camera.

BACKGROUND OF THE INVENTION

Miniature camera modules have been widely used in portable electronic devices, such as mobile phones, digital cameras. Such cameras may use a lens module driven by a voice coil motor, in which upper and lower suspension devices in the form of springs, support the lens holder as it moves along the optic axis, so as to allow smooth and continuous movement of the lens.

However, in the conventional voice coil motor, the upper and lower suspension devices are formed from separate spring sheets. This kind of manufacturing method has a comparatively high production cost due to material wastage and individual handling.

Hence there is a desire for an improved method of manufacturing suspension devices.

SUMMARY OF THE INVENTION

This is achieved in the present invention by using a single sheet of spring material to form two suspension devices simultaneously.

Accordingly, in one aspect thereof, the present invention provides a method of manufacturing suspension devices comprising the steps of: a) forming an integral elastic sheet, the elastic sheet having first and second suspension devices, each suspension device being provided with attachment parts configured to be fixed to a movable object, fixing parts configured to be fixed to a base, and elastic parts connected between the attachment parts and the fixing parts respectively and configured to bias the object relative to the base, the elastic parts of the suspension devices being alternately distributed; and b) separating the first and second suspension devices from each other, the separated suspension devices each being a single item before being attached to the object.

Preferably, the method includes etching a sheet of resilient material to form the elastic sheet.

Preferably, the elastic sheet comprises a frame connected with the suspension devices, the method further includes separating the first suspension devices from the frame before it is fixed to the object, and separating the second suspension devices from the frame after it is fixed to the object.

Preferably, during separating of the suspension devices, the attachment parts of the first suspension device are kept directly connected together, and the attachment parts of the second suspension device are separated from each other.

Preferably, before the step of separating, the attachment parts of the suspension devices are connected together.

Preferably, the attachment parts are distributed along a substantially circular path, each elastic part comprises a plurality of circumferential extending parts extending in a circumferential direction of the circle and radially spaced, corner parts connecting adjacent circumferential extending parts, and radially extending parts extending in a radial direction of the circle to connect the attachment part and the fixing part to the circumferential extending parts.

Preferably, the first and second suspension device comprises a plurality of separate sections each comprising one of the attachment parts, one of the elastic parts and one of the fixing parts, the method including using a sub-frame to connect together the attachment parts of the first suspension device after it is separated from the elastic sheet, and removing the sub-frame after the first suspension device is attached to the object.

Preferably, the method includes connecting the sub-frame to the attachment parts of the second suspension device in the elastic sheet and severing the connection between the sub-frame and the attachment parts of the second suspension device when separating the first suspension device from the elastic sheet.

Preferably, the method includes connecting the frame with the suspension devices via necked connection points.

Preferably, the method includes connecting the sub-frame with the suspension devices via necked connection points.

Preferably, the object is a lens holder, and the method includes attaching the attachment parts of a first one of the suspension devices to a first end of the lens holder and attaching the attachment parts of a second one of the suspension devices to a second end of the lens holder.

An advantage of the present invention is that: the two suspension devices can be formed at a time from a single sheet of spring material, so as to increase production efficiency, increase material utilization and reduce costs.

BRIEF DESCRIPTION OF THE DRAWINGS

Preferred embodiments of the invention will now be described, by way of example only, with reference to the accompanying drawings, in which.

Figure 1:
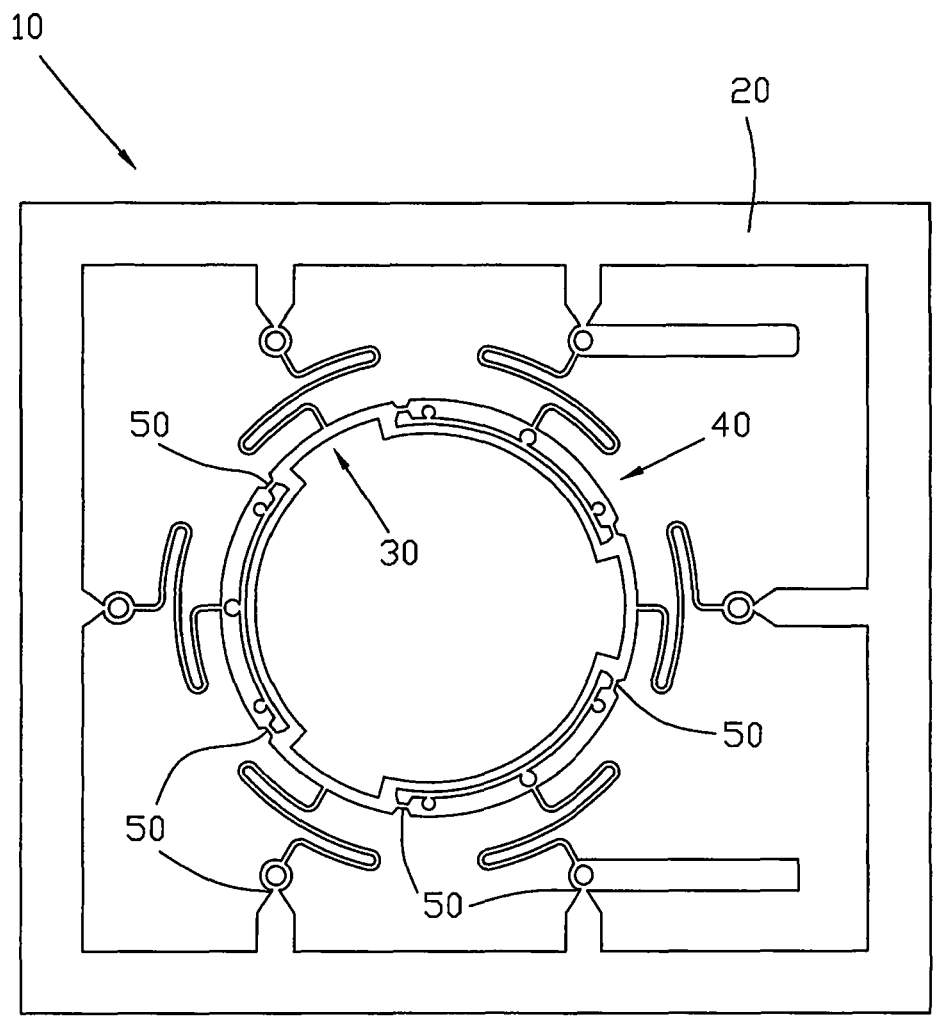
FIG. 1 is a schematic diagram of an elastic sheet formed according to a first preferred embodiment of the present invention.

In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale.

DETAILED DESCRIPTION OF THE PREFERRED EMBODIMENTS

Figure 10:
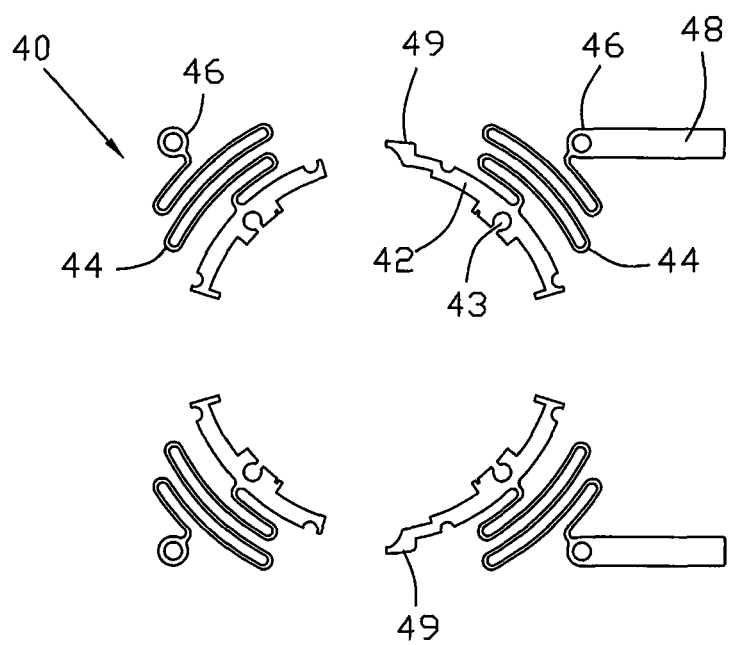
FIG. 10 is a schematic diagram similar to FIG. 9, with the frame removed.
Figure 11:
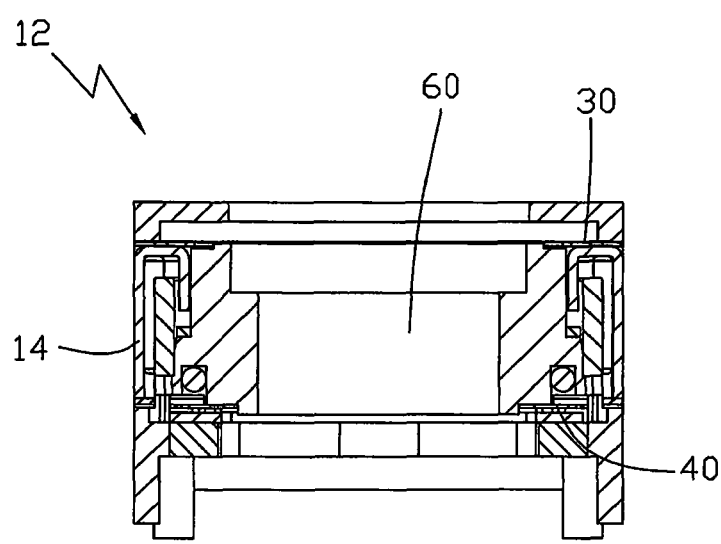
FIG. 11 is a sectional schematic view of a voice coil motor actuated lens module for a miniature camera.

FIG. 10 illustrates a lens module 12 typically for use in a miniature camera as used in phones, computers, etc. The lens module 12 has a housing 14 which accommodates a voice coil motor and a movable lens holder 60, among other things. The lens holder 60 is connected to the housing by first (upper) and second (lower) suspension devices 30, 40, which are, in essence, one or more springs or spring elements. The suspension devices allow the voice coil motor to move the lens holder along an optic axis of the lens or the axis of the lens holder, against the resilient urgings of the springs.

Referring to FIGS. 1 to 5, the suspension devices are formed from a laminate or sheet of a resilient material such as beryllium copper. The suspension devices may be formed from the sheet material by any suitable means such as stamping, cutting and lancing but it is preferred to using an etching process due to the delicate nature of the material involved and the shape of the spring elements. Alternatively, they may be made by a printing process.

Firstly, an elastic sheet 10 is formed from the sheet of resilient material by material removal or by a printing process. The elastic sheet 10 has a frame 20 which gives the sheet integrity, a first suspension device 30 and a second suspension device 40. The first suspension device 30 is typically fitted to a top, upper or outer end of the lens holder and the second suspension device 40 is typically fitted to a lower or inner end of the lens holder 60. The suspension devices are connected to the frame and to each other through severable necked connection points 50.

Figure 2:
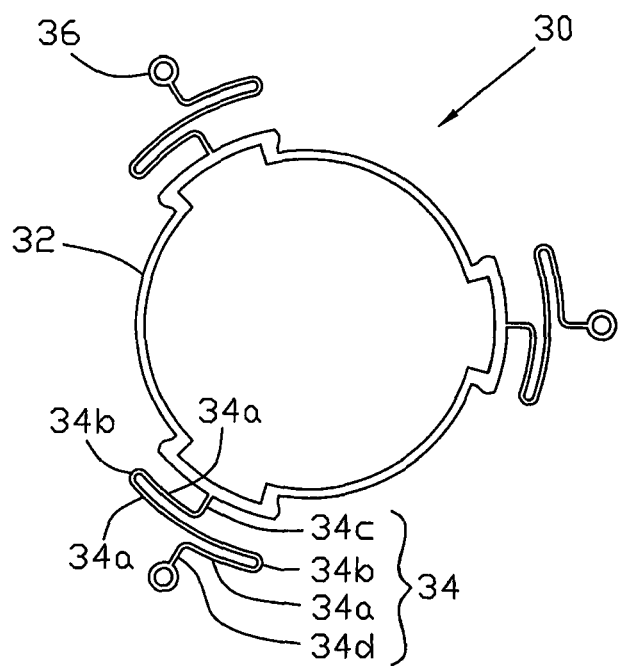
FIG. 2 is a schematic diagram of a first suspension device separated from the elastic sheet of FIG. 1.

Once the elastic sheet has been formed the first suspension device 30 can be separated from the elastic sheet 10 by severing the associated connection points 50, to give the complete first suspension device 30 as shown in FIG. 2, ready to be fixed to the lens holder.

The first suspension device comprises an attachment part 32 which is fixed to the first end of the lens holder, preferably by glue or as a form fit. In this embodiment the attachment part is a single piece of annular form. The first suspension device has three fixing parts 36 for fixing the suspension device to a base such as the housing of the lens module. The fixing parts are each annular parts designed to fit or locate about posts on the housing. The posts may then be plastically deformed, e.g. by hot stacking or plastic welding, to permanent retain the first suspension device. A plurality of elastic parts 34, preferably three, join respective fixing parts 36 to the attachment part 32. Each elastic part 34 is serpentine like and comprises several radially spaced, circumferentially extending parts 34a interconnected by corner parts 34b connecting adjacent circumferentially extending parts 34a, a first radially extending part 34c connecting the attachment part 32 to the circumferential direction extending parts 34a, and a second radially extending part 34d connecting the fixing part 36 to the circumferentially extending parts 34a. The elastic parts 34 can be resiliently deformed by movement of the lens holder along the optic axis, relative to the base, to urge or press the lens holder 60 back to its home or rest position.

Figure 3:
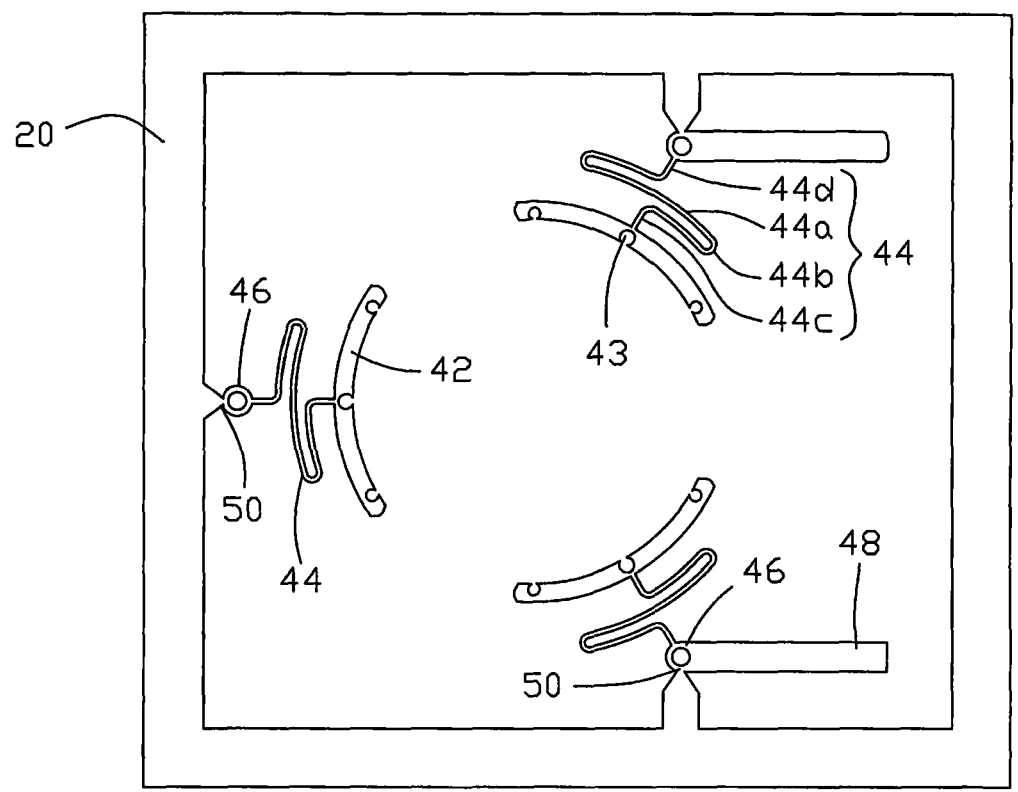
FIG. 3 is a schematic diagram of a second suspension device and a frame which remain after the first suspension device is separated from the elastic sheet.
Figure 4:
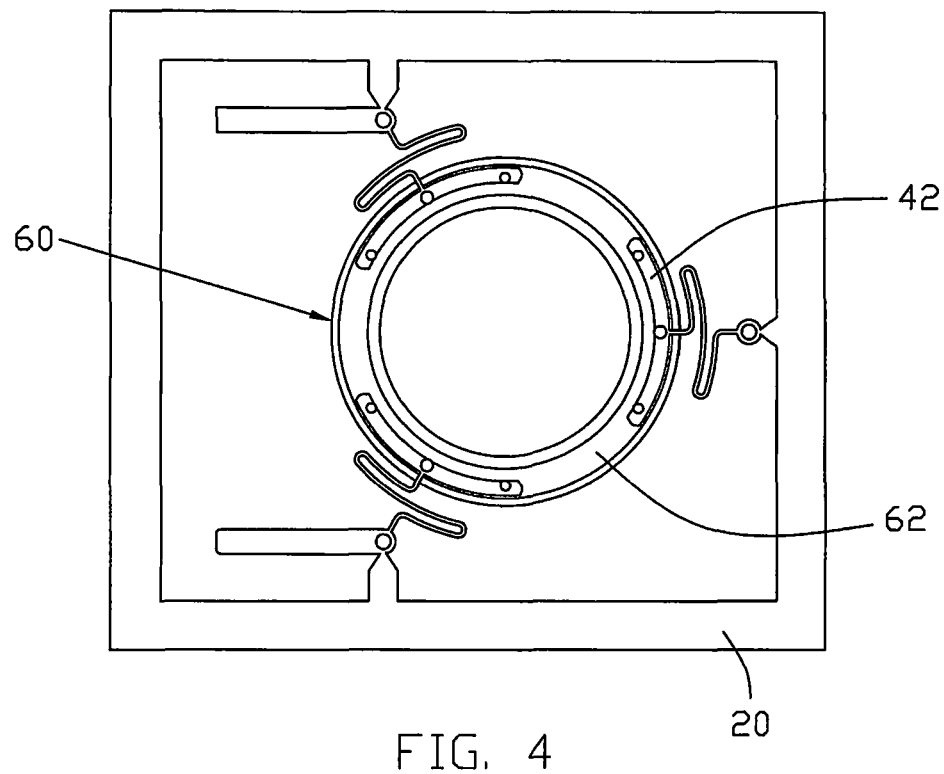
FIG. 4 is a schematic diagram of the second suspension device and frame of FIG. 3 being to a lens holder.
Figure 5:
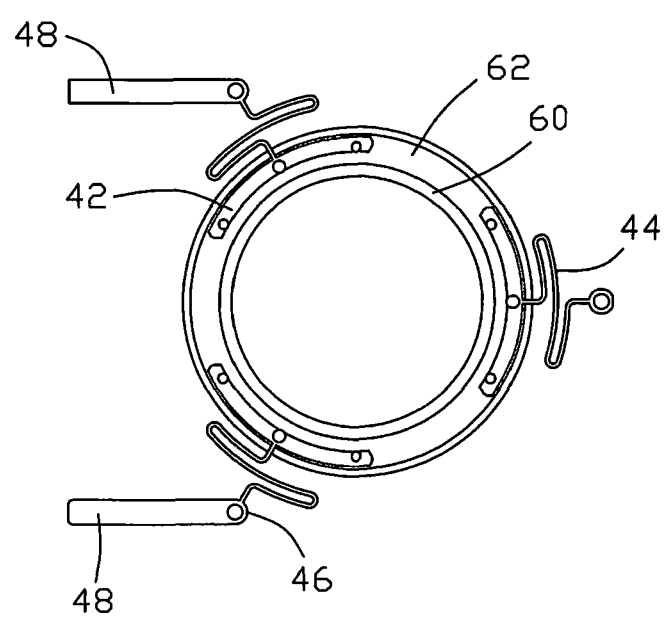
FIG. 5 is a schematic diagram similar to FIG. 4 with the frame removed.
Figure 6:
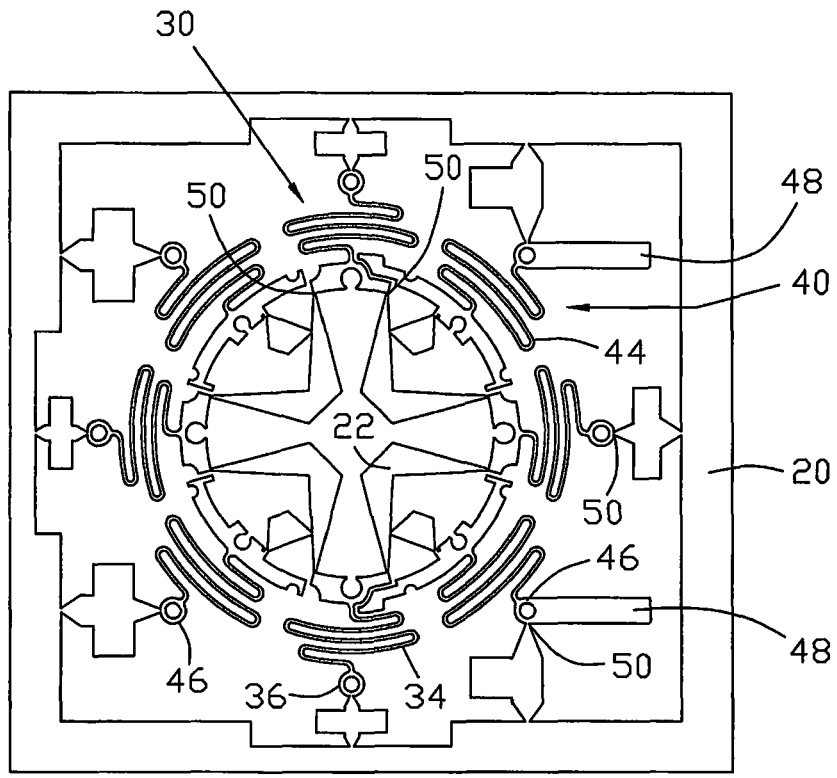
FIG. 6 is a schematic diagram of an elastic sheet formed according to a second preferred embodiment of the present invention.

The second suspension device 40 remains connected to the frame 20 when the first suspension device is removed, as shown in FIG. 3. It is preferred, though not essential, that the second suspension device 40 remains connected to the frame while it is fitted to the lens holder 60 as shown in FIG. 4. In this manner the frame 20 supports the, preferably three, separate pieces of the second suspension device 40 while it is being fitting to the lens holder.

As shown in FIG. 3, the second suspension device 40 comprises attachment parts 42 capable of being attached to the lens holder 60, fixing parts 46 for being fixed to a base, such as the housing of the lens holder, and elastic parts 44 connecting the attachment parts 42 to the fixing parts 46. The attachment part 42 comprises several sections (preferably three as shown) separated from each other. Each section is of a concentric arc shape and each section is provided with an opening 43 for the convenience of fixing the attachment part 42 to a flange 62 of the lens holder 60 by welding or hot staking a post on the flange. The elastic part 44 is serpentine like and comprises several radially spaced, circumferentially extending parts 44a, interconnected by corner parts 44b connecting adjacent parts 44a, a first radially extending part 44c connecting the attachment part 42 and the parts 44a, and a second radially extending part 44d connecting the fixing part 46 and the parts 44a. The elastic parts 44 can be resiliently deformed, together with elastic parts 34, to press the lens holder 60 relative to the base along the axial direction of the lens holder 60. The second suspension device 40 also comprises two conductive terminals 48 separately extending from respective fixing parts 46 to be connected to a circuit board (not shown in the figures) by an electric connection. The coil of the voice coil motor is electrically and physically connected to the two attachment part 42 of the sections of the second suspension device 40 which have the conductive terminals 48. Thus the two sections with the terminals 48 also act as the electrical connection for the coil.

Thus, according to a first embodiment of the present invention, as illustrated in FIGS. 1 to 5, the method of manufacturing suspension devices comprises the following steps:

a) forming an integral elastic sheet 10, the elastic sheet having first and second suspension devices 30, 40, each suspension device being provided with attachment parts 32, 42, configured to be fixed to a movable object, such as lens holder 60, fixing parts 36, 46, configured to be fixed to a base, such as housing 14, and elastic parts, 34, 44, connected between the attachment parts and the fixing parts respectively and configured to bias the object relative to the base, the elastic parts of the suspension devices being alternately distributed; and b) separating the first and second suspension devices 30, 40, from each other before being attached to the object.

As an embodiment of the present invention, first the first suspension device 30 is separated from the elastic sheet 10 by severing the connection points 50, and then the suspension device 40 is separated from the elastic sheet 10. Preferably, the second suspension device 40 is separated from the elastic sheet 10 after it is fixed to the object that is supported, such as a lens holder 60, and by this way, the suspension device 40 can be conveniently fixed to the object.

The round attachment part 32 of the first suspension device 30 is located on the elastic sheet adjacent the abutment parts 42 of the second suspension device 40. The attachment parts 32, 42, and the fixing parts 36, 46, are laid out as they would be when attached to the supported object, the lens holder 60 and to the base, the housing 14, and held in that location by the frame 20. The attachment part 32 has portions located between adjacent elastic parts 34 which are shifted radially inwardly relative to the remainder and sections of the attachment parts 42 of the second suspension device 40 are separately located adjacent the shifted portions of the attachment part 32 and connected to the attachment part 32 by connection points 50. The elastic parts 34, 44 of the two suspension devices 30, 40 are alternately distributed, preferably equally spaced, in the circumferential direction of the lens holder 60.

Before the step of separating, several necked connection points 50 are separately located between the frame 20 and the fixing parts 36, 46. In addition, connection neck parts 50 may also be provided between the frame 20 and the attachment parts 32, 42.

Figure 7:
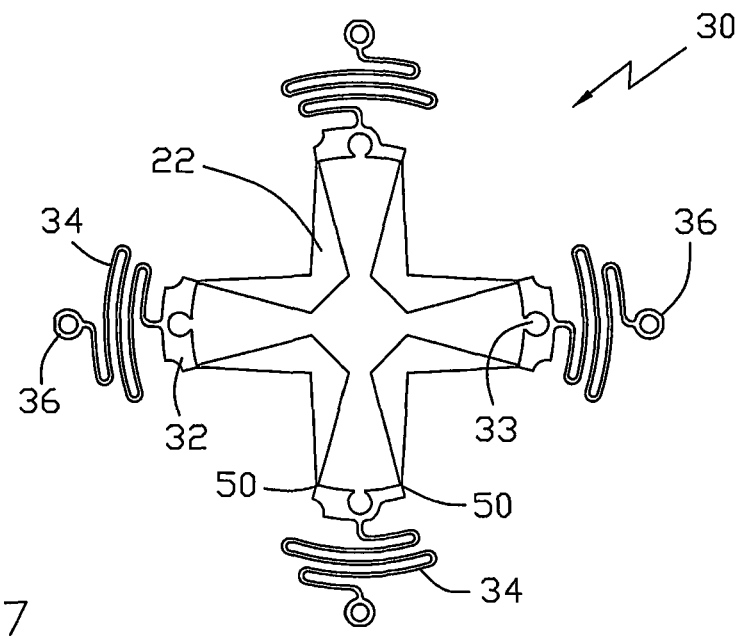
FIG. 7 is a schematic diagram of a first suspension device and sub-frame separated from the elastic sheet of FIG. 6.
Figure 8:
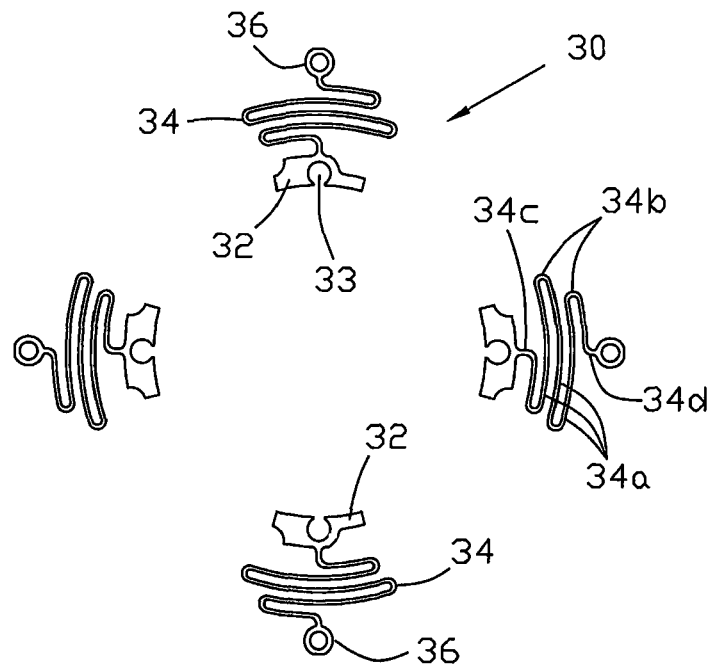
FIG. 8 is a schematic diagram of the first suspension device of FIG. 7 with the sub-frame removed.
Figure 9:
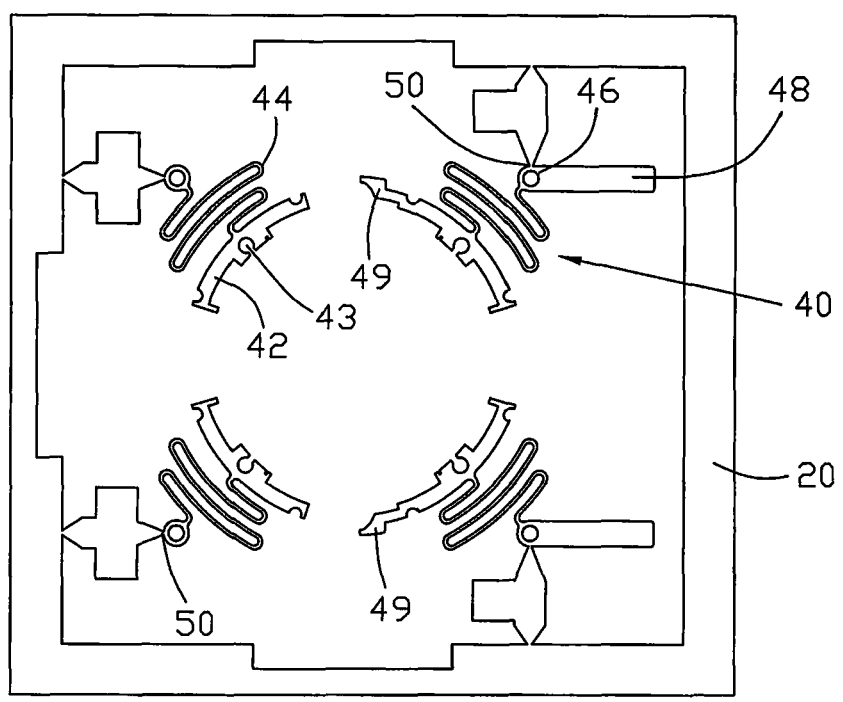
FIG. 9 is a schematic diagram of a second suspension device and a frame which remain after the first suspension device is separated from the elastic sheet of FIG. 6.

FIGS. 6-10 show a method of manufacturing suspension devices in accordance with a second embodiment of the present invention. This method is similar to the method described before except that in this method the first suspension device 30 comprises a plurality of separate sections each comprising one attachment part 32, one elastic part 34 and one fixing part 36. The embodiment also shows the use of four elastic parts in each suspension device. After separating the first suspension device 30 from the elastic sheet 20, the sections of the first suspension device 30 are connected together via connection portions of a sub-frame 22, as shown in FIG. 7. The sections of the second suspension device 40 are connected together via the frame 20, as shown in FIG. 8. The connection portions of the sub-frame 22 are connected with the attachment parts 46 of the second suspension device 40 before the step of separating. After the first suspension device 30 is attached to a lens holder, the sub-frame 22 severed or is cut away from the first suspension device 30 by a tool. The connections are preferably made by severable necked connection points 50. The frame 20 and the sub-frame 22 maintain the spacing and relative orientation of the respective portions of the attachment parts 32, 42, for ease of fitting to the lens holder, after which the frame and sub-frame may be removed.

Two of the sections of the second suspension device 40 have terminals 48 extending from the fixing parts 46 for connection of electrical wires and tabs 49 formed on the attachment parts 42 for connection of the wire from the coil of the voice coil motor.

In the present invention, at least two suspension devices 30, 40 are formed at the forming step, which is productive. Also, the at least two suspension devices 30, 40 are formed from a single sheet of resilient material, which is material saving compared with conventional forming method at which only one suspension device is formed each sheet of resilient material.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A method of manufacturing suspension devices comprising the steps of:
   a) forming an integral elastic sheet, the elastic sheet having first and second suspension devices, each suspension device being provided with attachment parts configured to be fixed to a movable object, fixing parts configured to be fixed to a base, and elastic parts connected between the attachment parts and the fixing parts respectively and configured to bias the object relative to the base, the elastic parts of the suspension devices being alternately distributed;
   b) separating the first and second suspension devices from each other, the separated suspension devices each being a single item before being attached to the object.

2. The method of claim 1, including etching a sheet of resilient material to form the elastic sheet.

3. The method of claim 1, wherein the elastic sheet comprises a frame connected with the suspension devices, the method further includes separating the first suspension device from the frame before it is fixed to the object, and separating the second suspension device from the frame after it is fixed to the object.

4. The method of claim 3, wherein during separating of the suspension devices, the attachment parts of said first suspension device are kept directly connected together, and the attachment parts of the second suspension device are separated from each other.

5. The method of claim 1, wherein before the step of separating, the attachment parts of the suspension devices are connected together.

6. The method of claim 5, wherein the attachment parts are distributed along a substantially circular path, each elastic part comprises a plurality of circumferential extending parts extending in a circumferential direction of the circle and radially spaced, corner parts connecting adjacent circumferential extending parts, and radially extending parts extending in a radial direction of the circle to connect the attachment part and the fixing part to the circumferential extending parts.

7. The method of claim 1, wherein the first and second suspension device comprises a plurality of separate sections each comprising one of the attachment parts, one of the elastic parts and one of the fixing parts, the method including using a sub-frame to connect together the attachment parts of the first suspension device after it is separated from the elastic sheet, and removing the sub-frame after the first suspension device is attached to the object.

8. The method of claim 7, including connecting the sub-frame to the attachment parts of the second suspension device in the elastic sheet and severing the connection between the sub-frame and the attachment parts of the second suspension device when separating the first suspension device from the elastic sheet.

9. The method of claim 3, including connecting the frame with the suspension devices via necked connection points.

10. The method of claim 8, including connecting the sub-frame with the suspension devices via necked connection points.

11. The method of claim 1, wherein the object is a lens holder, and the method includes attaching the attachment parts of a first one of the suspension devices to a first end of the lens holder and attaching the attachment parts of a second one of the suspension devices to a second end of the lens holder.

* * * * *